US006834286B2

(12) United States Patent
Srinivasan et al.

(10) Patent No.: US 6,834,286 B2
(45) Date of Patent: Dec. 21, 2004

(54) METHOD AND SYSTEM FOR REPRESENTING AND ACCESSING OBJECT-ORIENTED DATA IN A RELATIONAL DATABASE SYSTEM

(75) Inventors: Uppili Srinivasan, Fremont, CA (US); Harpinder Madan, Stanford, CA (US); Sanjay Jain, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 734 days.

(21) Appl. No.: 09/778,235

(22) Filed: Feb. 6, 2001

(65) Prior Publication Data

US 2001/0051948 A1 Dec. 13, 2001

Related U.S. Application Data

(63) Continuation of application No. 09/206,778, filed on Dec. 7, 1998, now Pat. No. 6,587,856.

(51) Int. Cl.[7] .............................................. G06F 17/30
(52) U.S. Cl. .................... 707/103 R; 709/200; 709/230
(58) Field of Search ............................ 707/103 R, 100, 707/101, 102, 104.1, 3–4, 10, 8, 201; 709/200, 230; 711/129, 156; 713/1, 200; 717/106

(56) References Cited

U.S. PATENT DOCUMENTS

| 4,714,995 A | 12/1987 | Materna et al. |
| 5,295,256 A | 3/1994 | Bapat |
| 5,442,780 A | 8/1995 | Takanashi et al. |
| 5,454,160 A | 10/1995 | Nickel |
| 5,471,613 A | 11/1995 | Banning et al. |
| 5,499,371 A | 3/1996 | Henninger et al. |
| 5,615,362 A | 3/1997 | Jensen et al. |
| 5,664,173 A | 9/1997 | Fast |
| 5,706,506 A | 1/1998 | Jensen et al. |
| 5,799,306 A | 8/1998 | Sun et al. |
| 5,806,074 A | 9/1998 | Souder et al. |

(List continued on next page.)

OTHER PUBLICATIONS

Ein–Dor, Phillip et al., "Natural Language Access to Multiple Databases: A Model and a Prototype", Journal Management Information Systems, Summer 1995, vol. 12, No. 1, pp. 171–197.
Ozsoyoglu, Gultekin et al., "Query Processing Techniques in the Summary–Table–by–Example Databse Query Language", ACM Transactions on Database Systems, vol. 14, No. 4, Dec. 1989, pp. 526–573.
Microsoft Press Computer Dictionary, Microsoft Press, Third Edition, p. 392.
Innosoft Int., Inc., LDAP FAQ, Jun., 1997, pp. 1–7.
W. Yeong, et al. Lightweight Directory Access Protocol, Mar. 1995, pp. 1–20.
T. Howes, A String Representatino of LDAP Search Filters, December 1993, pp. 1–3.
T. Howes, et al., The String Representation of Standard Attribute Syntaxes, Mar., 1995, pp. 1–11.
S. Kille, A String Representation of Distinguished Names, Mar. 1995, pp. 1–8.
A. Young, Connection–less Lightweight Directory Access Protocol, Jun. 1995, p. 1–8.

(List continued on next page.)

*Primary Examiner*—Diane D. Mizrahi
(74) *Attorney, Agent, or Firm*—Bingham McCutchen LLP

(57) ABSTRACT

A method and system for representing objects in a relational database is provided. In one aspect, the invention provides a method and system for storing directory information objects in a relational database management system. In addition, a method and system for generating a statement in a database query language to search or manipulate objects or entries that are stored in a relational database is disclosed. An aspect of the invention is directed to a method and system that can automatically generate a SQL statement for an LDAP search filter.

16 Claims, 15 Drawing Sheets

U.S. PATENT DOCUMENTS

| | | | |
|---|---|---|---|
| 5,809,502 A | 9/1998 | Burrows | |
| 5,884,324 A | 3/1999 | Cheng et al. | |
| 5,937,409 A | 8/1999 | Wetherbee | 707/103 |
| 5,937,414 A | 8/1999 | Souder et al. | |
| 5,963,932 A | 10/1999 | Jakobsson et al. | |
| 5,995,999 A | 11/1999 | Bharadhwaj | |
| 6,009,422 A | 12/1999 | Ciccarelli | |
| 6,012,067 A | 1/2000 | Sarkar | 707/103 |
| 6,016,499 A | 1/2000 | Ferguson | 707/104 |
| 6,029,178 A | 2/2000 | Martin et al. | |
| 6,047,284 A * | 4/2000 | Owens et al. | 707/4 |
| 6,052,681 A | 4/2000 | Harvey | 707/3 |
| 6,058,401 A * | 5/2000 | Stamos et al. | 707/201 |
| 6,078,924 A * | 6/2000 | Ainsbury et al. | 707/101 |
| 6,078,925 A | 6/2000 | Anderson et al. | |
| 6,085,188 A | 7/2000 | Bachmann et al. | 707/3 |
| 6,122,258 A | 9/2000 | Brown | |
| 6,122,630 A | 9/2000 | Strickler et al. | |
| 6,131,098 A | 10/2000 | Zellweger | |
| 6,134,559 A | 10/2000 | Brumme et al. | |
| 6,154,743 A | 11/2000 | Leung et al. | |
| 6,163,776 A | 12/2000 | Periwal | |
| 6,178,416 B1 | 1/2001 | Thompson et al. | |
| 6,189,000 B1 | 2/2001 | Gwertzman et al. | |
| 6,199,062 B1 | 3/2001 | Byrne et al. | |
| 6,301,589 B1 | 10/2001 | Hirashima et al. | |
| 6,338,092 B1 | 1/2002 | Chao et al. | |
| 6,356,913 B1 | 3/2002 | Chu et al. | |
| 6,412,017 B1 | 6/2002 | Straube et al. | |
| 6,453,310 B1 | 9/2002 | Zander | |
| 6,601,064 B1 * | 7/2003 | Nag et al. | 707/4 |

OTHER PUBLICATIONS

T. Howes, et al., The LDAP Application Program Interface, Aug. 1995, pp. 1–20.

T. Howes, et al., An LDAP URL Format, Jun. 1996, pp. 1–4.

ldap–support@umich.edu, Referrals Within the lDAPv2 Protocol, Aug., 1996, pp. 1–4.

Innosoft Int., Inc: Lightweight Directory Access Protocol (Version 3) Specifications, 1996–1998, pp. 1–3.

Howes, et al., A Scalable, Deployable, Directory Service Framework for the Internet, Aug., 1995, pp. 1–2.

* cited by examiner

Organization Class Table

| Entry No. | Org. Name |
|---|---|
| 96 | Oracle |

FIG. 2A

Department Class Table

| Entry No. | Org. Name | State |
|---|---|---|
| 97 | Administrative | CA |
| 98 | Sales | NY |
| 99 | R & D | CA |

FIG. 2B

Person Class Table

| Entry No. | Last Name | First Name | Tel. No. | State | Manager |
|---|---|---|---|---|---|
| 100 | Doe | John | 555-1111 | CA | Larry Founder |
| 101 | Smith | Jim | 555-2222 | NY | John Doe |
| 102 | Jones | Joe | 555-3333 | CA | Jim Smith |
| 103 | Founder | Larry | 555-4444 | CA | |

FIG. 2C

Revised Person Class Table

| Entry No. | Last Name | First Name | Tel. No. | Manager | State | Email Address |
|---|---|---|---|---|---|---|
| 100 | Doe | John | 555-1111 | Larry Founder | CA | jdoe |
| 101 | Smith | Jim | 555-2222 | John Doe | NY | |
| 102 | Jones | Joe | 555-3333 | Jim Smith | CA | |
| 103 | Founder | Larry | 555-4444 | | CA | |

302

Attribute Store Table

| | EID | AttrName | AttrVal | AttrKind |
|---|---|---|---|---|
| | 96 | Org. Name | Oracle | User |
| | 97 | Dept. Name | Administration | User |
| | 97 | State | CA | User |
| | 98 | Dept. Name | Sales | User |
| | 98 | State | NY | User |
| | 99 | Dept. Name | R & D | User |
| 416 | 99 | State | CA | User |
| 418 | 100 | First name | John | User |
| 420 | 100 | Last name | Doe | User |
| 422 | 100 | Tel. No. | 555-1111 | User |
| 423 | 100 | Manager | Larry Founder | User |
| | 100 | State | CA | User |
| | 101 | First name | Jim | User |
| | 101 | Last name | Smith | User |
| | 101 | Tel. No. | 555-2222 | User |
| | 101 | Manager | John Doe | User |
| | 101 | State | NY | User |
| | 102 | First name | Joe | User |
| | 102 | Last name | Jones | User |
| | 102 | Tel. No. | 555-3333 | User |
| | 102 | Manager | Jim Smith | User |
| | 102 | State | CA | User |
| | 103 | First name | Larry | User |
| | 103 | Last name | Founder | User |
| | 103 | Tel. No. | 555-4444 | User |
| | 103 | State | CA | User |
| 446 | 100 | Modifiation Timestamp | 01/01/97 | Operational |
| | 101 | Modification Timestamp | 07/01/97 | Operational |
| | 102 | Modification Timestamp | 07/30/98 | Operational |
| | 103 | Modification Timestamp | 01/01/98 | Operational |

| | EID | AttrName | AttrVal | AttrKind |
|---|---|---|---|---|
| | ⋮ | ⋮ | ⋮ | ⋮ |
| 416 | 100 | First name | John | User |
| 418 | 100 | Last name | Doe | User |
| 420 | 100 | Tel. No. | 555-1111 | User |
| 422 | 100 | Manager | Larry Founder | User |
| 423 | 100 | State | CA | User |
| 446 | 100 | Modification Timestamp | 01/01/97 | Operational |
| 502 | 2 | Attribute _Type | Name="First Name" Parameter=name syntax; only one first name; | User |
| 504 | 2 | Attribute _Type | Name="Last Name" Parameter=name syntax; only one first name; | User |
| 506 | 2 | Attribute _Type | Name="Tel. No." Parameter=telephone number syntax; can have up to two. | User |
| 508 | 2 | Attribute _Type | Name="Manager" Parameter=name syntax with first and last name; can have multiple managers. | User |
| 509 | 2 | Attribute_Type | Name="State" Parameter=State syntax; only one state | User |
| 510 | 2 | Attribute _Type | Name="Modification Timestamp" Parameter=date syntax; only one modification timestamp. | User |
| 512 | 2 | Object classes | Name="Person"; Mandatory Attr= "First Name", "Last Name", "Modification Timestamp"; Optional Attr= "Tel.No.", "Manager", "State" | User |
| 514 | 100 | Object class | Person | User |
| | ⋮ | ⋮ | ⋮ | ⋮ |

FIG. 5

Last Name Catalog Table

| EID | AttrValue |
|-----|-----------|
| 100 | Doe |
| 103 | Founder |
| 102 | Jones |
| 101 | Smith |

FIG. 6A

First Name Catalog Table

| EID | AttrValue |
|-----|-----------|
| 101 | Jim |
| 100 | Joe |
| 102 | John |
| 103 | Larry |

FIG. 6B

Telephone Number Catalog Table

| EID | AttrValue |
|-----|-----------|
| 100 | 5551111 |
| 101 | 5552222 |
| 102 | 5553333 |
| 103 | 5554444 |

FIG. 6C

Manager Catalog Table

| EID | AttrValue |
|-----|-----------|
| 102 | joe jones |
| 101 | john doe |
| 100 | larry founder |

FIG. 6D

State Catalog Table

| EID | AttrValue |
|-----|-----------|
| 97  | CA        |
| 98  | NY        |
| 99  | CA        |
| 100 | CA        |
| 101 | NY        |
| 102 | CA        |
| 103 | CA        |

FIG. 6E

Distinguished Name Table

| EID | RDN | ParentDN |
|---|---|---|
| 96 | Oracle | |
| 97 | Administration | Oracle |
| 98 | Sales | Oracle |
| 99 | R&D | Oracle |
| 100 | John Doe | Oracle.R&D |
| 101 | Jim Smith | Oracle.R&D |
| 102 | John Jones | Oracle.Sales |
| 103 | Larry Founder | Oracle.Administrative |

METHOD AND SYSTEM FOR REPRESENTING AND ACCESSING OBJECT-ORIENTED DATA IN A RELATIONAL DATABASE SYSTEM

CROSS-REFERENCE TO RELATED APPLICATION

This application is a continuation of application Ser. No. 09/206,778 filed Dec. 7, 1998 now U.S. Pat. No. 6,587,856.

BACKGROUND OF THE INVENTION

1. Field of the Invention

The present invention is related to the storage of data within database systems. More particularly, the present invention is directed to the storage and access of object-oriented entities within a relational database management system.

2. Background

Many computer programming languages and applications utilize object-oriented structures to model real world information. Object-oriented languages and applications access and store data in the form of entities such as objects and attributes. For example, many conventional applications used for querying and maintaining directory information systems are modeled using aspects of object-oriented techniques and entities. Directory information systems provide a framework for the storage and retrieval of information that are used to identify and locate the details of individuals and organizations, such as telephone numbers, postal addresses, and email addresses.

One common type of object-oriented based directory systems is a directory based on the Lightweight Directory Access Protocol ("LDAP"). LDAP is a directory protocol that was developed at the University of Michigan, originally as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information. Further details of the LDAP directory protocol can be located at the LDAP-devoted website maintained by the University of Michigan at htt://www.umich.edu/-dirsvcs/ldap/, including the following documents (which are hereby incorporated by reference): RFC-1777 Lightweight Directory Access Protocol; RFC-1558 A String Representation of LDAP Search Filters; RFC-1778 The String Representation of Standard Attribute Syntaxes; RFC-1779 A String Representation of Distinguished Names; RFC-1798 Connectionless LDAP; RFC-1823 The LDAP Application Program Interface; and, RFC-1959 An LDAP URL Format.

LDAP directory systems are normally organized in a hierarchical structure having entries (i.e., objects) organized in the form of a tree, which is referred to as a directory information tree ("DIT"). The DIT is often organized to reflect political, geographic, or organizational boundaries. A unique name or ID (which is commonly called a "distinguished name") identifies each LDAP entry in the DIT. An LDAP entry is a collection of one or more entry attributes. Each entry attribute has a "type" and one or more "values." Each entry belongs to one or more object classes. Entries that are members of the same object class share a common composition of possible entry attribute types.

Referring to FIG. 1, shown is an example of a hierarchical tree of directory entities. Entry 96 is the top most level of DIT 20 and is of object class "organization" having an attribute type "Org. Name" with an attribute value of "Oracle". Entry 96 is the "parent" entry for three "child" entries (97, 98, and 99) directly beneath it in DIT 20. Entries 97, 98, and 99 are objects of object class "Department" each having attributes "Dept. Name" and "State." Entry 97 has an attribute type "Dept. Name" having a value of "Administration" and an attribute type "State" with the value "CA". Entry 98 has an attribute "Dept. Name" with the value "Sales" and an attribute type "State" with an attribute value "NY". Entry 99 has an attribute type "Dept. Name" with an attribute value "R&D" and an attribute type "State" with a value of "CA".

Entry 103 is a child entry of entry 97. Entry 103 represents an object of class "Person" having the following attribute type-value pairs: (1) attribute type "Last Name" with a value of "Founder"; (2) attribute type "First Name" with a value of "Larry"; (3) attribute type "Tel. No." with a value of "555-4444"; and (4) attribute type "State" with a value of "CA".

Entry 102 is a child entry of entry 98. Entry 102 represents an object of class "Person" having the following attribute type-value pairs: (1) attribute type "Last Name" with a value of "Jones"; (2) attribute type "First Name" with a value of "Joe"; (3) attribute type "Tel. No." with a value of "555-3333"; (4) attribute type "Manager" having the value of "Jim Smith"; and (5) attribute type "State" having the value "CA". Note that entries 102 and 103 are both members of object class Person, but entry 102 has more listed object attributes than entry 103. In many object-oriented systems, objects that are members of the same object class may share a common set of possible object attributes, but some members of the class may not necessarily have values for some of the possible attributes. In this example, entry 103 does not have a value for attribute type "Manager" while entry 102 does have a value for this attribute.

Entries 100 and 101 are child entries of entry 99. Entries 100 and 101 are both members of object class "Person." Entry 100 is defined by the following attribute type-value pairs: (1) attribute type "Last Name" with a value of "Doe"; (2) attribute type "First Name" with a value of "John"; (3) attribute type "Tel. No." with a value of "555-1111"; (4) attribute type "Manager" having the value of "Larry Founder"; and (5) attribute type "State" having the value "CA". Entry 101 is defined by the following attribute type-value pairs: (1) attribute type "Last Name" with a value of "Smith"; (2) attribute type "First Name" with a value of "Jim"; (3) attribute type "Tel. No." with a value of "555-2222"; and (4) attribute type "Manager" having the value of "John Doe"; and (5) attribute type "State" having the value "NY".

One significant issue that has been faced by organizations seeking to develop an LDAP system is the selection of the type and configuration of a database system used to store the object-oriented LDAP data. A particularly desirable choice for many database configurations is to utilize a relational database management system ("RDBMS"). The relational database model provides many benefits when implementing a database application. For example, the relational database model has well-defined structures and entities (e.g., tables, views, indexes, etc.) to store or access the data of a database. RDBMS systems provide advanced database transaction, data consistency, recovery, and backup support. RDBMS systems also provide for clearly defined actions and operations to manipulate the data and structures of the database. Moreover, many RDBMS applications are designed to interoperate with standard database query languages (e.g., SQL) to access and modify data on the system.

The difficulty with implementing object-oriented applications, such as LDAP directory systems, in an RDBMS is that object-oriented data are based upon a fundamentally different data model than relational data. Object-oriented data are formed as entities which have specific object-oriented characteristics (e.g., objects and attributes). In contrast, the data in a relational database model are normally stored in database tables that are organized as an array of rows and columns. The values in the columns of a given row are typically associated with each other in some way. For example, a row may store a complete data record relating to a sales transaction, a person, or a project. Columns of the table define discrete portions of the rows that have the same general data format or data type. Thus, there are significant differences in structure between object-oriented data and relational data.

FIGS. 2A, 2B, and 2C depict one approach to storing object-oriented data, such as the entries from DIT 20 of FIG. 1, into an RDBMS. In this approach, a separate table is provided for each object class in the system. FIG. 2A shows an object class table 202 for the Organization class, which includes entry 96 from DIT 20 as a member of that class. FIG. 2B is an example of an object class table 204 for the object class Department, which includes entries 97, 98, and 99. FIG. 2C is an example of an object class table 206 for the object class Person, which includes entries 100, 101, 102, and 103 from DIT 20.

Each row of the object class table represents a single object of that corresponding object class. Thus, the Person class table 206 of FIG. 2C includes four rows, one row for each of the person class entries of DIT 20 (i.e., entries 100, 101, 102, and 103). Discrete columns within the object class table represent attributes of an object within the object class. A separate column must be provided for each possible attribute of an object class. The Person class table 206 of FIG. 2C includes five columns for object attributes "Last Name," "First Name," "Tel. No.," "Manager," and "State." Similar rows and columns in FIGS. 2A and 2B describe the objects and attributes for the Department and Organization objects of DIT 20. Thus, the approach illustrated in FIGS. 2A, 2B, and 2C can be employed to represent object-oriented data in relational tables.

Referring to FIG. 2C, note that row 208 contains an empty space in the "Manager" column. This highlights one of the drawbacks of this approach. It is possible that some members of an object class may not have values for all possible attributes for that class. Entry 103 does not have a value for the "Manager" attribute, even though other members of the Person class 20 possess a value for that attribute type. The problem is that in the approach illustrated by FIGS. 2A–C, a column must be defined for each of the possible attributes of an object class. For each row in the table, resources may be set aside to allow values for all of the defined columns, even if some rows do not actually have values for one or more of the columns. Under this approach, system resources are wasted if any members of the class do not have a value for all defined attributes for the object class. This problem is further exasperated by very large object class tables having a large number of members that do not have values for particular columns.

Another drawback to this approach is that object class tables are not readily extensible, since the database schema itself has to be modified to allow changes to the definition of an object class. Such a change in definition occurs, for example, if an object attribute is being added or deleted from an object class. For example, consider when object class Person (represented by object class table 206 in FIG. 2C) is to be modified to include a new object attribute type called "Email Address." To implement this modification to the Person object class, the defining schema structure of the corresponding object class table must be modified to include a new column for the new attribute type. FIG. 3 depicts a revised Person class table 302 that includes a column for the new attribute type "Email Address." In operation, this modification typically involves the issuance of numerous data definition language ("DDL") statements to modify the base schema of the database.

Generally, modifying the database schema is not a trivial task, and is performed only by administrators having specialized privileges to access and modify the metadata and structural definitions of the system. Moreover, adding columns to an existing relational database table could result in database fragmentation. This occurs because the data for the new column may not be co-located with the existing table data on a disk drive. Thus, performance suffers because two disk locations are accessed to access a single row from the database table. In addition, the method described with reference to FIGS. 2A–C suffers drawbacks when storing objects types that have multiple attribute values for an attribute type, since a single column is provided for an attribute type in an object class table.

Therefore, there is a need for an improved method and system for storing and maintaining object-oriented data in an RDBMS. In addition, there is a particular need for an improved system and method of storing and maintaining directory information objects, such as LDAP data, in an RDBMS.

SUMMARY OF THE INVENTION

A method and system for representing object-oriented data in a relational database is disclosed. An aspect of the invention is directed to the representation and storage of directory information objects, such as LDAP directory data, in a relational database system.

One feature of an aspect of the invention is directed to the use of catalog tables that correlate object identification numbers to specific attribute values. Another feature of the invention involves the storage of metadata information within the same database table as the data it describes. Yet another aspect of the invention is directed to a distinguished names table that stores identification information for objects.

Further details of aspects, objects, and advantages of the invention are described below in the detailed description, drawings, and claims. Both the foregoing general description and the following detailed description are exemplary and explanatory in nature, and serve to explain the principles of the invention.

BRIEF DESCRIPTION OF THE DRAWINGS

FIGS. 2A, 2B, and 2C depict object class tables for storing object-oriented data in relational tables.

FIG. 4 shows an attribute-store table according to an embodiment of the invention.

FIG. 5 depicts an attribute-store table having metadata entries.

FIGS. 6A, 6B, 6C, 6D and 6E depict examples of catalog tables according to an embodiment of the invention.

FIG. 7 illustrates a distinguished name table according to an embodiment of the invention.

DETAILED DESCRIPTION

System Architecture

An embodiment of the present invention involves the implementation of a single table that comprises information describing objects and object attributes on the system. This table is hereby referred to as the "attribute_store" table. The attribute_store table comprises four columns having the following characteristics: Column Name Datatype Constraint Description

| Column Name | Datatype | Constraint | Description |
| --- | --- | --- | --- |
| EID | Number | Not null | ID for an entry |
| AttrName | Character-numeric | | Attribute ID for a particular attribute |
| AttrVal | Character-numeric | | Attribute values |
| AttrKind | Character string | Not null | Kind of Attribute (Operational, User etc.) |

Figure 1:
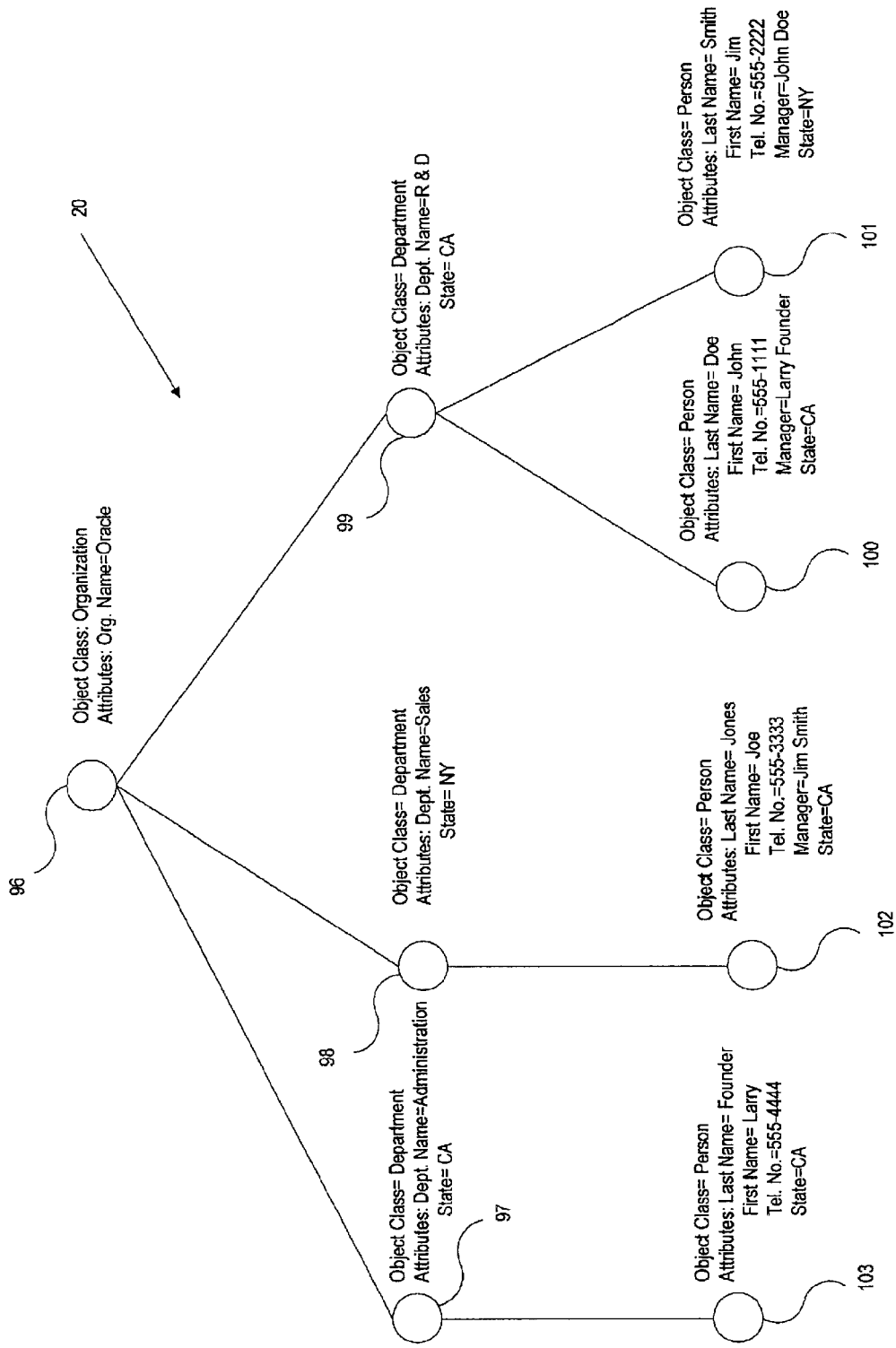
FIG. 1 illustrates an example of a directory information tree.
Figure 3:
FIG. 3 depicts a revised version of the object class table of FIG. 2C.

FIG. 4 depicts an example of an attribute_store table 400 for entries in the DIT 20 of FIG. 1. All entries in DIT 20 are represented in attribute_store table 400, regardless of the particular object class that an entry belongs to. An entry is represented by one or more rows in table 400. A set of rows having the same EID describes the attributes for the same entry in DIT 20. Each row shown in attribute_store table 400 corresponds to a separate attribute for an entry.

Consider entry 100 from DIT 20, which is represented in attribute_store table 400 by rows 416, 418, 420, 422, 423, and 446. The combination of the contents of these rows describes the attributes of entry 100. Each row in attribute_store table 400 comprises a column that identifies that row's corresponding EID. These particular rows (416, 418, 420, 422, 423, and 446) are identified as being associated with entry 100 since all of these rows comprise the same value of 100 in their EID column. Each of these rows describes a different attribute for entry 100. For each row, the "Attr-Name" column identifies which object attribute is being described, and the "AttrVal" column identifies the value(s) for that attribute. For entry 100, row 416 describes attribute "First Name" having a value of "John", row 418 identifies the value "Doe" for attribute "Last Name", row 420 identifies the value "555-1111" for attribute "Tel No.", row 422 identifies the value "Larry Founder" for attribute "Manager," and row 423 identifies the value "CA" for attribute "State." Each of the other entries from DIT 20 is similarly represented by sets of one or more rows in the attribute store table 400.

In an embodiment, the rows in attribute_store table 400 contain an "AttrKind" column. This column identifies additional system categories for the object attributes. For example, one category of attribute kinds that can be identified according to the invention refers to access and modification privileges for particular object attribute. Two examples of attribute kinds relating to access and modification privileges are "User" and "Operational" attributes. User attributes are attributes that can be modified by the user, entity or organization associated with a particular entry. Operational attributes are attributes that are maintained by the system, and thus cannot be altered or modified except by the system. For example, row 420 identifies attribute type "Tel. No." for entry 100 as being of AttrKind user, and thus the user or entity associated with entry 100 is permitted to modify this attribute value. Row 446 provides an example of an attribute type that is of attribute kind "operational" (i.e., "Modification Timestamp"). Many directory systems maintain a timestamp of the last modification time/date for each directory entry. Row 446 describes attribute "modification timestamp" for entry 100 having a value of "01/01/97." Since this attribute type is "operational," the entity or person corresponding to entry 100 is not normally permitted to modify this attribute value. In an alternate embodiment of the invention, the attribute_store table is configured without having a column for the AttrKind value.

Metadata

The present invention provides an improved method for adding, modifying, and maintaining metadata in the system. In a database system, metadata refers to information that describes the data in the system. Metadata information includes data that describes the structure and parameters of the tables and data maintained in the system. In a conventional RDBMS, metadata is usually maintained separately from its associated data and tables on the system.

One significant advantage of the present invention is that metadata, such as directory schema information, can be maintained within the same table as its associated data. To accomplish this, the present invention permits rows that define metadata, referred to as "subschema entries," to be inserted into the attribute_store table. Subschema entries allow management of the directory schema for the system without having to issue DDL commands to modify the database schema. In an embodiment, subschema entries comprise the following characteristics for columns in the attribute_store table:

| Column Name | Datatype | Constraint | Description |
| --- | --- | --- | --- |
| EID | Number | Not null | EID indicative of subschema entries |
| AttrName | Character string | Not null | Identifies the type of subschema entity being added (e.g., attribute, object class, etc.) |
| AttrVal | Encoded string | Not null | Subschema element name and parameters |
| AttrKind | Character string | Not null | Kind of subschema entry (e.g., user, Operational, etc.) |

FIG. 5 illustrates the use of subschema entries to define metadata in the system. Depicted in FIG. 5 is an attribute_store table showing selected rows that describe the attributes for entry 100 of DIT 20 (i.e., rows 416, 418, 420, 422, 423, and 446). The table of FIG. 5 also includes additional rows (rows 502, 504, 506, 508, 509, 510, 512, and 514) that describe some of the metadata associated with entry 100. In an embodiment, subschema entries that define new object classes or object attributes comprise a selected EID value that is indicative of that particular type of subschema entry. In the table of FIG. 5, rows having an EID of "2" are recognized by the system as subschema entries that define system metadata for attributes and object classes. Whenever a row is added to the attribute_store table with an EID value of 2, the system recognizes that a new metadata definition has been added. The AttrName column of a subschema entry identifies the type of subschema entity being added. In the example of FIG. 5, a subschema entry that adds a new attribute type would contain the value "Attribute_Type" in the AttrName column (i.e., rows 504, 506, 508, 509, and 510). A subschema entry that adds a new object class contains the value "Object Classes" in the AttrName column (i.e., row 512). The AttrVal column for a subschema entry describes the name and parameters of the new metadata type that is being added. The AttrKind column of the subschema entry identifies additional system kinds or categories for the object class or attribute being added.

To illustrate this aspect of the invention, consider row 506, which is a subschema entry that defines the attribute type "Tel. No." The EID column of row 506 contains the value "2", to indicate that this row is a subschema entry that is modifying the directory system metadata. The AttrName column of row 506 contains the value "Attribute_Type" to indicate that row 506 is defining an attribute type. The AttrVal column of row 506 indicates that the name of the attribute type being defined is "Tel. No."

The AttrVal column also describes the defining parameters of the new object attribute. One such parameter is the attribute encoding syntax for the allowable values for this attribute. In this example, the particular attribute encoding syntax defined in row 506 describes the syntax for information permitted to be entered in the "AttrVal" column of row 420 (since row 420 describes an attribute of the attribute type defined in row 506). The attribute coding syntax for any particular attribute can be selected to achieve desired formatting and input requirements for that attribute. In an embodiment, a set of syntax definitions can be predefined in the system, and all new attribute types added to the system must correspond to these pre-defined syntax definitions. For example, a particular attribute coding syntax called "TelephoneNumberSyntax" can be defined for encoding values for attributes types related to telephone numbers in the directory system. In a present embodiment, the standard attribute coding syntax definitions utilized in the invention are based upon standard syntaxes published for the LDAP directory protocol.

The AttrVal column of a subschema entry can also identify the quantity of values to be provided for the defined attribute type. For example, if the attribute being added is a telephone number, it is possible for some entities to have more than one telephone number. A parameter can be defined in the subschema entry that specifies a minimum or maximum number of telephone number values allowed for that attribute. Alternatively, the subschema entry could identify whether an attribute type comprises either single value, or multiple values of that attribute. These examples of parameters used for subschema entries are only exemplary; other types of attribute parameters can be employed for subschema entries within the scope of the present invention.

Subschema entries can also be utilized to define an object class. Row 512 is a subschema entry that defines the object class "Person." The EID column of row 512 has a value of "2", which identifies this row as a subschema entry that defines directory schema metadata. The AttrName column of row 512 contains the character string "ObjectClasses" to indicate that metadata for an object class is being defined. The AttrVal column provides the name of the defined object class. In row 512, the name of the defined object class is identified as "Person." Additional information is also stated in the AttrVal column to define the parameters of the object class. For example, one such parameter is the mandatory attributes of the new object class. Each member of an object class must have stated values for the mandatory attributes. In the example of row 512, the mandatory attributes of object class "Person" are attribute types "First Name", "Last Name", and "Modification Timestamp". Other parameters that may be defined are the optional attributes of the object class. Members of an object class are permitted to have no stated values for optional attributes. In row 512, the optional attributes of object class "Person" are defined to be attribute types "Tel. No." and "Manager". Row 512 also identifies the attribute kind of the object class as type "User".

Row 514 provides an example of a metadata row to define a member of an object class. In row 514, entry 100 is defined as a member of object class "Person." The EID column of row 514 contains the EID of the new object. The AttrName column identifies that a new member of an object class is being created. The AttrVal column of row 514 identifies the particular object class that the new entry is a member of. The AttrKind column identifies the kind of the new object. In this row, the new object is of attribute kind "User."

To further illustrate the invention, consider the situation when object class Person of DIT 20 (FIG. 1) is to be modified to include a new attribute type "Email Address." To implement this modification, the following subschema entry is added to attribute_store table 400 to define the new attribute type:

| 2 | Attribute_Type | Name="Email Address" Parameter=email syntax; more than one value allowed | User |
|---|---|---|---|

The subschema entry for each object class seeking to add the new attribute type to its definition is modified. Since object class Person is being modified in this example, Row 512 from attribute_store table 400 (which defines object class Person) is modified to include the new attribute type as part of the definition for this class (the modifications are italicized):

| 2 | Object classes | Name="Person" Mandatory Attr= "First Name", "Last Name", "Modification Timestamp"; Optional Attr= "Tel No.", "Manager", *"Email Address"* | User |
|---|---|---|---|

Finally, each member of object class Person that seeks to define a value for this attribute type may add a new row to the attribute_store table with the appropriate attribute values. Thus, if entry 100 seeks to include the email address "jdoe" as an attribute, the following row is added to attribute_store table 400:

| 100 | Email Address | jdoe | User |
|---|---|---|---|

Catalog Tables

Specialized tables, referred to herein as "catalog tables", are maintained as indexes into the attribute_store table. Catalog tables provide efficient searches for objects having particular attribute values in the attribute-store table. A separate catalog table is maintained for each attribute type that is indexed. Each catalog table comprises two columns. The first column is the EID column, which identifies the EID of an entry or object having an attribute of the cataloged attribute type. The second column provides the attribute value for that corresponding EID and attribute type.

FIGS. 6A–E depict examples of catalog tables for some of the attribute types shown in attribute_store table 400. FIG. 6A depicts a catalog table that indexes the attribute type "Last Name." Each entry having an attribute of type "Last Name" is cataloged in the table of FIG. 6A. Similarly, FIG. 6B depicts a catalog table for the attribute type "First Name", FIG. 6C depicts a catalog.table for the attribute type "Telephone Number", FIG. 6D depicts a catalog table for the attribute type "Manager", and FIG. 6E depicts a catalog table for the attribute type "State".

Each row of the catalog table is directed to a different entry that contains the cataloged attribute type. Each row identifies the EID of the entry of object comprising that attribute type, and the attribute value for that EID. If a new object is added to the system having an attribute of a cataloged type, then a new entry is added to the respective catalog table. If an existing object having a cataloged attribute type is deleted or the attribute for that object is deleted, then the corresponding entry in the respective catalog table is also deleted. In an embodiment, the catalog table is maintained in a sorted list of entries.

Catalog tables store the attribute value information in a normalized or canonical format, which is based upon matching rules established for each attribute type. Matching rules are descriptions of rules that are used to perform a query, search, sort, or comparison of attribute values. The definition of each attribute type specifies which matching rule should be used to compare its attribute values. One matching rule is specified for each type of matching (e.g., equality, substring, ordering, or approximate match) if that matching is allowed for the attribute type. The type of matching types allowed may depend on the syntax of the attribute type (e.g. ordering match may not be allowed on attribute types of syntax 'binary'). A matching rule may be used by multiple attribute types and multiple attribute syntaxes. The definition of a matching rule involves:

1. assigning an object identifier to the matching rule;
2. defining the syntax of an assertion of the matching rule;
3. specifying the different types of matches supported by the rule; and
4. defining the appropriate rules for evaluating a presented assertion with respect to target attribute values held in the directory information database;

A matching rule is used to evaluate attribute value assertions of attributes. The syntax used in the attribute value assertion (i.e. the assertion component of the attribute value assertion) is the matching rule's assertion syntax. A matching rule may apply to many different types of attributes with different attribute syntaxes. The definition of a matching rule includes a specification of the syntax of an assertion of the matching rule and the way in which values of this syntax are used to perform a match. A definition of a matching rule for use with attributes with different ASN.1 syntaxes specifies how matches are to be performed. In the preferred embodiment, the invention supports the standard LDAP protocol matching rules.

Based upon the matching rules, the normalized format for an attribute type may be significantly different from the raw value that is stored in the attribute_store table. For example, the attribute type "Tel. No." may have several permissible syntax variations for the attribute value information stored in the attribute_store table. These may include, for example, the following syntax variations being allowed for telephone numbers in the attribute_store table: (555)555-1111; (555) 5551111; or 555-555-1111. However, the matching rules may indicate that only numbers are significant in a telephone number; all other characters and symbols in a telephone number are to be ignored. Thus, the canonical form of this telephone number may be stored in the catalog table in the following format: 5555551111. If a query is made against the telephone number catalog table, only numbers in the query search string (pursuant to the matching rules) will be considered when comparisons are made against entries in the catalog table.

If a query is issued which seeks a particular value for a cataloged attribute type, then the corresponding catalog table is searched for one or more EID numbers which corresponds to the requested search parameter. Thus, a database query can be issued for any particular attribute against the specific catalog table that is maintained for that attribute. The result of the database query is a list of EID numbers for objects that contains the queried attribute parameters. For example, a database query that requests every object in DIT 20 (FIG. 1) having a first name beginning with "John" will result in a search of the "First Name" catalog table (FIG. 6B) for a list of EID numbers which has a corresponding attribute "First Name" that matches with "John" (in this example, an EID value of "102" is returned). The resulting list of EID number(s) points to the entries in the attribute_store table 400 (FIG. 4) that contain the queried attribute.

The use of catalog tables in the present invention provides a significant advantage over systems that store objects within separate object class tables, such as the approach taken in FIGS. 2A–C. The advantage of the present invention arises because several different object classes may contain objects having a particular attribute type. In the present invention, a single catalog table indexes a particular attribute type, regardless of the object class of the objects having that attribute type. Thus, only a single table has to be searched to query against any particular object attribute type.

As an example, consider a query that requests every object in DIT 20 having an attribute type "State" with the value "NY". In the present invention, a search of a single catalog table, i.e., the state catalog table (FIG. 6E), finds two entries (EID 98 and EID 101) that match this query parameter. Note that these entries are members of different object classes, with entry 98 a member of object class "Department" and entry 101 a member of object class "Person". In the approach of FIGS. 2A–C, the same attribute type may be represented in many different object class tables since objects from different object classes may contain the same attribute type. In such a system, a query for a particular object attribute type may require multiple queries placed against each of the object class tables having a column for the queried attribute type. For the above example that searches for all objects having attribute value "NY" for the "State" attribute, each object class table having a column for this attribute (i.e., the department class table of FIG. 2B and the person class table of FIG. 2C) must be searched. Thus, in the present invention, the number of tables (i.e., catalog tables) that need to be queried for any particular search is a function of the number of attributes within the search terms.

Whereas in the system of FIGS. 2A–C, the number of tables to be queried increases in correspondence to the number of object class tables that has a column for the queried attribute type.

Distinguished Names Table

In an embodiment of the invention, a table is maintained to track and identify the hierarchical relationship between objects in the DIT 20. This table is hereby referred to as the "distinguished name" table. In a present embodiment, the distinguished name table comprises three columns having the following characteristics:

| Column | Datatype | Constraint | Description |
| --- | --- | --- | --- |
| EID | number | Not null | Entry ID |
| RDN | Variable character-numeric string | Not null | Relative Distinguished Name |
| ParentDN | Variable character-numeric string | Not null | Parent Distinguished Name |

A distinguished name is a unique identifier that is used to refer to an entry unambiguously in the directory system. The distinguished name of an entry can be constructed by concatenating the relative distinguished name of an entry with the distinguished name of its parent entry. The relative distinguished name of an entry is the unique identifier of an entry within its own level in the DIT. The concatenation of the entry's relative distinguished name with its parent's distinguished name constructs an identifier that is unique within the entire directory system.

FIG. 7 depicts an example of a distinguished name table 700 for the DIT 20 of FIG. 1. The EID column of the distinguished name table 700 contains the EID of an entry in the DIT 20. The RDN column contains the relative distinguished name of that the entry. The ParentDN column contains the "parent" distinguished name for that entry (i.e., the absolute path of the parent entry in the DIT 20).

In the example of FIG. 7, the relative distinguished name for EID 100 is "JohnDoe," which is a concatenation of the attributes "First Name" and "Last Name" for entry 100. The relative distinguished name provides a unique identifier for objects at the particular level of the tree that the object resides on. Other representations for the relative distinguished name of an entry may be utilized within the scope of the present invention. For example, the common name (".cn") attribute type may be employed as the relative distinguished name in standard LDAP systems.

The parent distinguished name for entry 100 is "R&D.Oracle," which is the absolute path of entry 100's parent entry in DIT 20 (i.e., entry 99). Thus, the distinguished name (and absolute path) of entry 100 is "JohnDoe.R&D.Oracle," which is the concatenation of entry 100's relative distinguished name and parent distinguished name.

Note that the parent distinguished name column in the preferred embodiment of the invention stores the pathname of the parent entries in reversed order, so that the ParentDN of entry 100 is stored as "Oracle.R&D" (rather than "R&D.Oracle"). In other words, the highest corresponding level of the tree is listed first, followed by each next-lower level of the tree until the parent node is reached. This is somewhat counter-intuitive since the parent distinguished name is stored in reverse order to its representation in the absolute path for an entry. Many conventional systems do not even store the entire pathname of an entry or of the entry's parent entry. Instead, these other systems store only the specific object/entry identifier for the entry's parent. To derive the entire path of an entry, these other systems must necessarily follow a chain of object/entry identifiers for parent entries until the root node is reached, at which point the entire pathname can be constructed.

Maintaining the full path of the parent distinguished name for an entry in a reversed format provides a significant advantage when performing subtree searches in a DIT. A subtree search is a search of an entire tree of entries beneath an arbitrary node in the DIT. To perform a subtree search in the present invention, a wildcard character is utilized to narrow the field of entries in the system to particular ones beneath the node to be searched. As an example, consider a search for all entries in DIT 20 that are in Dept.="R&D" and Organization="Oracle" which has a Tel No. ="555-1111". This is a subtree search because it searches for particular entries that are in the tree of entries beneath entry 99 in DIT 20. To perform this search in the present invention, the database query that is utilized may be stated in pseudocode form as follows: "Search for any entries in the DIT where Tel. No.='555-1111' and where ParentDN= 'Oracle.R&D*'," in which "*" is a wildcard symbol.

By storing the paths in reversed order in the distinguished names table 700, the range of entries that must be searched for the particular telephone number condition is considerably narrowed, since the indexed values can be used to find the matching entries. In conventional systems that store paths in a forward format, the same query may require the ParentDN portion be formatted as follows: "*R&D.Oracle," in which the wildcard symbol appears to the left of the parent distinguished name. Formatting the wildcard symbol to the beginning of the search string in this manner may necessitate a full scan of the stored data. With approaches that do not maintain a full path for the entries, this type of search query cannot be used without performing multiple steps to extrapolate the full pathname of the entry or its parent.

Protocol Compliant Data Storage

In an embodiment, the result of a query against an LDAP directory system returns the requested information in a format that is ready to be sent over a network (e.g., in LDAP-compliant formats). This can be implemented by maintaining a table similar to the attribute_store table of FIG. 4, but in which the "AttrVal" column contains appropriate raw or binary values for attributes of the system entries in the desired protocol compliant formats. To provide efficient query operations, the information stored for searching, such as the information that is maintained in catalog tables, are stored in an normalized format that is optimized for querying and searching. In this way, multiple entries for a particular attribute type may be stored in various different formats while still allowing full search capabilities against the stored data.

In an alternate embodiment, the protocol compliant formats for all attributes of an object can be stored in a single row of the attribute_store table. If a query requires all attributes of an object to be retrieved, this allows the access of a single row to result in the retrieval of all attributes for that object.

Operational Processes

The following are operational processes and methods utilized in an embodiment of the invention:

A. Define a New Attribute Type

Figure 8:
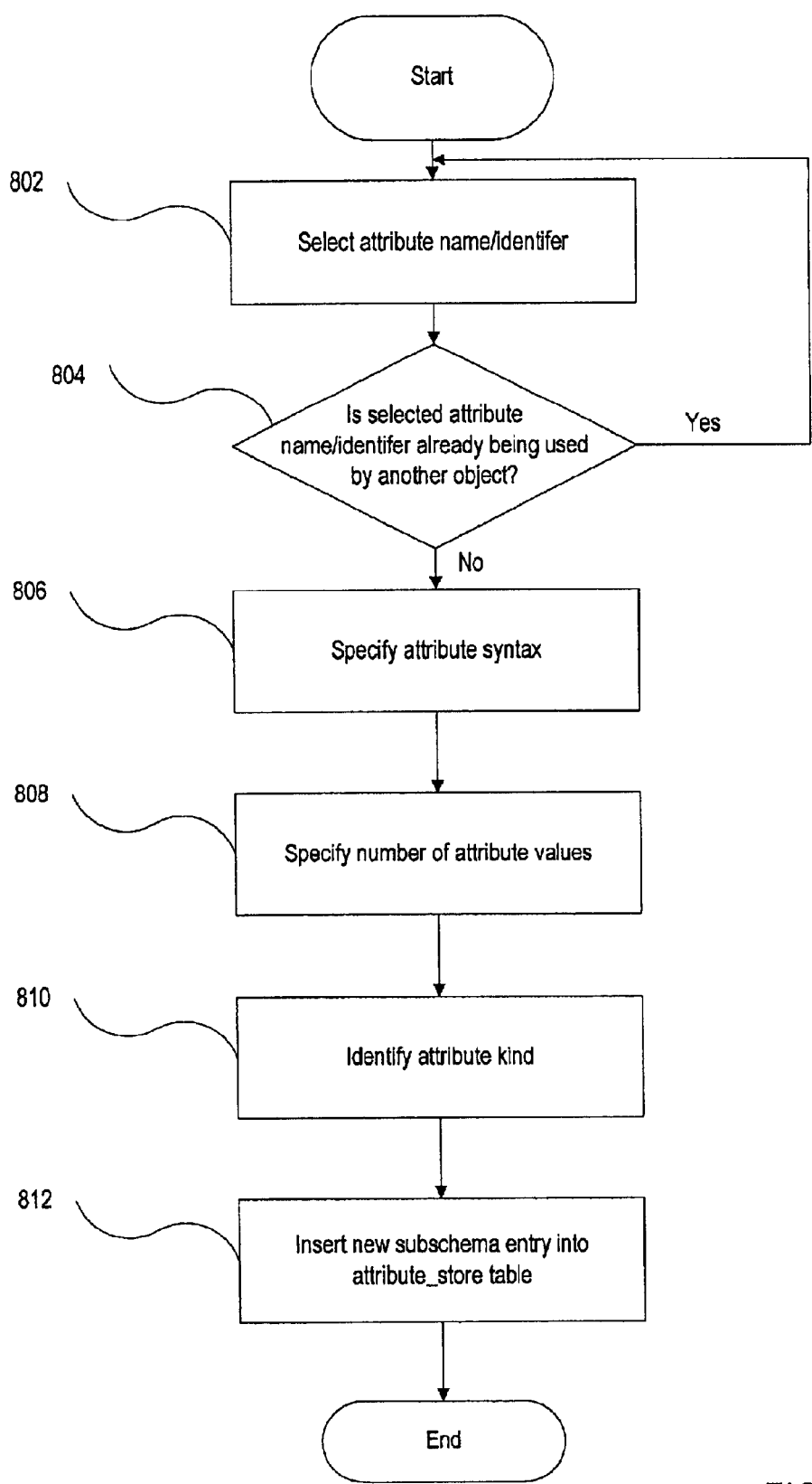
FIG. 8 is a flow diagram showing a process for defining a new attribute type.

A new attribute type can be defined by inserting a new subschema entry into the attribute_store table. Referring to FIG. 8, the following process actions are performed in an embodiment of the invention to define a new attribute type:

1. Select name and/or identifier for the new attribute type (802). If the selected name/identifier is already being used, then an alternate name/identifier must be selected (804).
2. Specify the attribute syntax for the new attribute type (806).
3. Indicate the number of values allows for the attribute type (808). In an embodiment, this action determines whether an attribute of this type shall have only one or whether it may have more than one value.
4. Indicate the attribute kind (e.g., whether the attribute type is operational or user) (810).
5. Insert new subschema entry into the attribute_store table having the defined parameters for the new attribute type (812). The subschema entry should have the correct EID value indicative of metadata for defining a new attribute type.

Other process actions can be additionally performed to define a new attribute type. For example, an additional act can be performed to indicate whether the new attribute type is a subtype of a previously defined attribute type. Subtypes of a previously defined attribute type inherit characteristics from its parent attribute type. Also, the forgoing process can perform an additional action to indicate the equality, ordering and/or substring matching rule(s) for the new attribute type.

B. Modify an Existing Attribute Type

Figure 9:
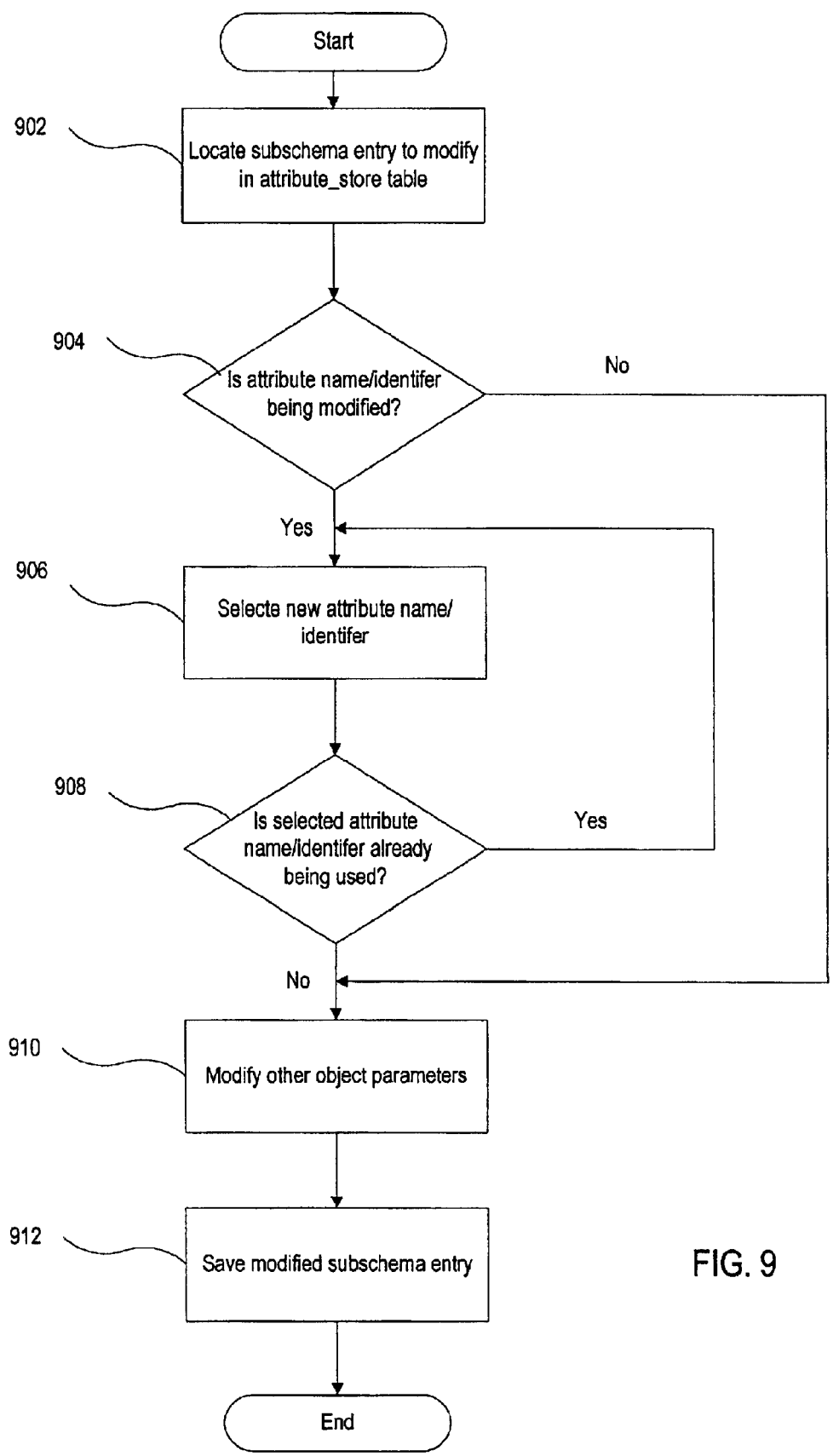
FIG. 9 is a flow diagram showing a process for modifying an attribute type.

An existing attribute type can be modified by editing the appropriate subschema entry in the attribute_store table. Referring to FIG. 9, the following process actions are performed in an embodiment of the invention to modify an existing attribute type:

1. Select the appropriate subschema entry to modify (902). The selected subschema entry is the row in the attribute_store table that defines the attribute type to be modified. The metadata rows in the attribute_store table that define an attribute type can be indexed in a separate catalog table to facilitate the selection of the appropriate subschema entry.
2. Determine whether the attribute name/identifier is being modified (904). If the attribute name/identifier is being modified, then select a new attribute name/identifier (906). The name/identifier for an attribute must be unique across the schema components. If the selected attribute name/identifier is already being used, then select an alternate attribute name/identifier (908).
3. Modify other attribute parameters (910). In an embodiment, a "single valued" attribute type can be modified to be a "multi-valued" attribute type, but the inverse is not permitted. In an alternate embodiment, a modification from "multi-valued" to "single valued" is permitted so long as all existing objects comprising the modified attribute type have only a single value for that attribute.
4. Save or commit modifications to the subschema entry in the attribute_store table (912).

C. Delete an Existing Attribute Type

Figure 10:
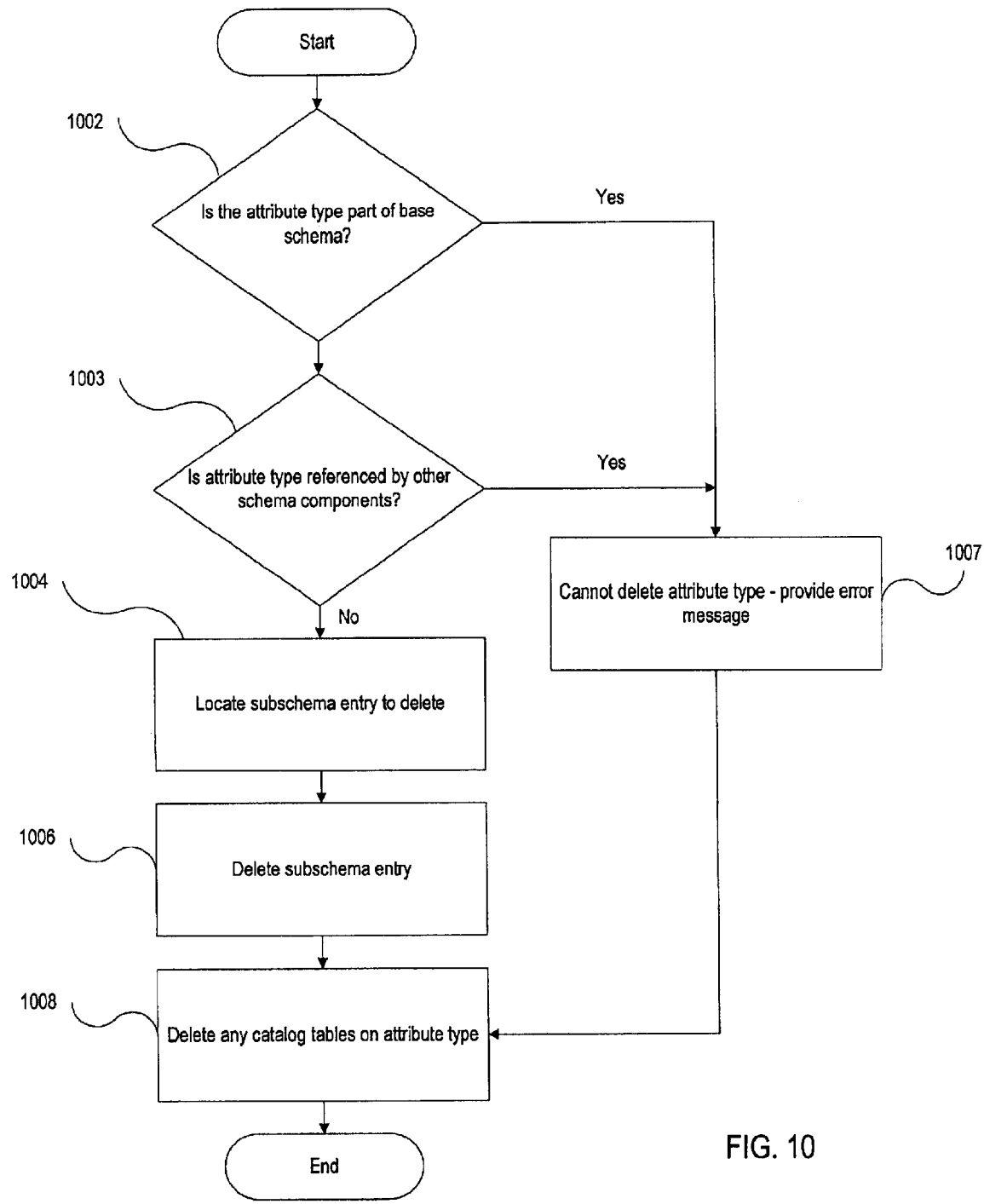
FIG. 10 is a flow diagram showing a process for deleting an attribute type.

An existing attribute type can be deleted by deleting the appropriate subschema entry in the attribute_store table. Referring to FIG. 10, the following process actions are performed in an embodiment of the invention to delete an existing attribute type:

1. Determine whether the attribute type to delete is part of the base schema (1002). Certain attributes can be defined as part of the base schema of the database and cannot be deleted from the system. If the attribute type is part of the base schema, provide an error message indicating that the attribute cannot be deleted (1007).
2. Determine whether attribute type to be deleted is referenced by any other schema components (1003). An attribute type cannot be deleted if it is referenced either directly or indirectly by any other schema component. If the attribute type is being referenced, provide an error message indicating that the attribute cannot be deleted (1007).
3. Locate the appropriate subschema entry in the attribute_store table that corresponds to the attribute type to be deleted (1004).
4. Delete subschema entry from the attribute_store table and commit the delete operation (1006).
5. Delete any catalog tables on the attribute type (1008). This may involve DDL operations to change the schema of the database.

D. Define a New Object Class

Figure 11:
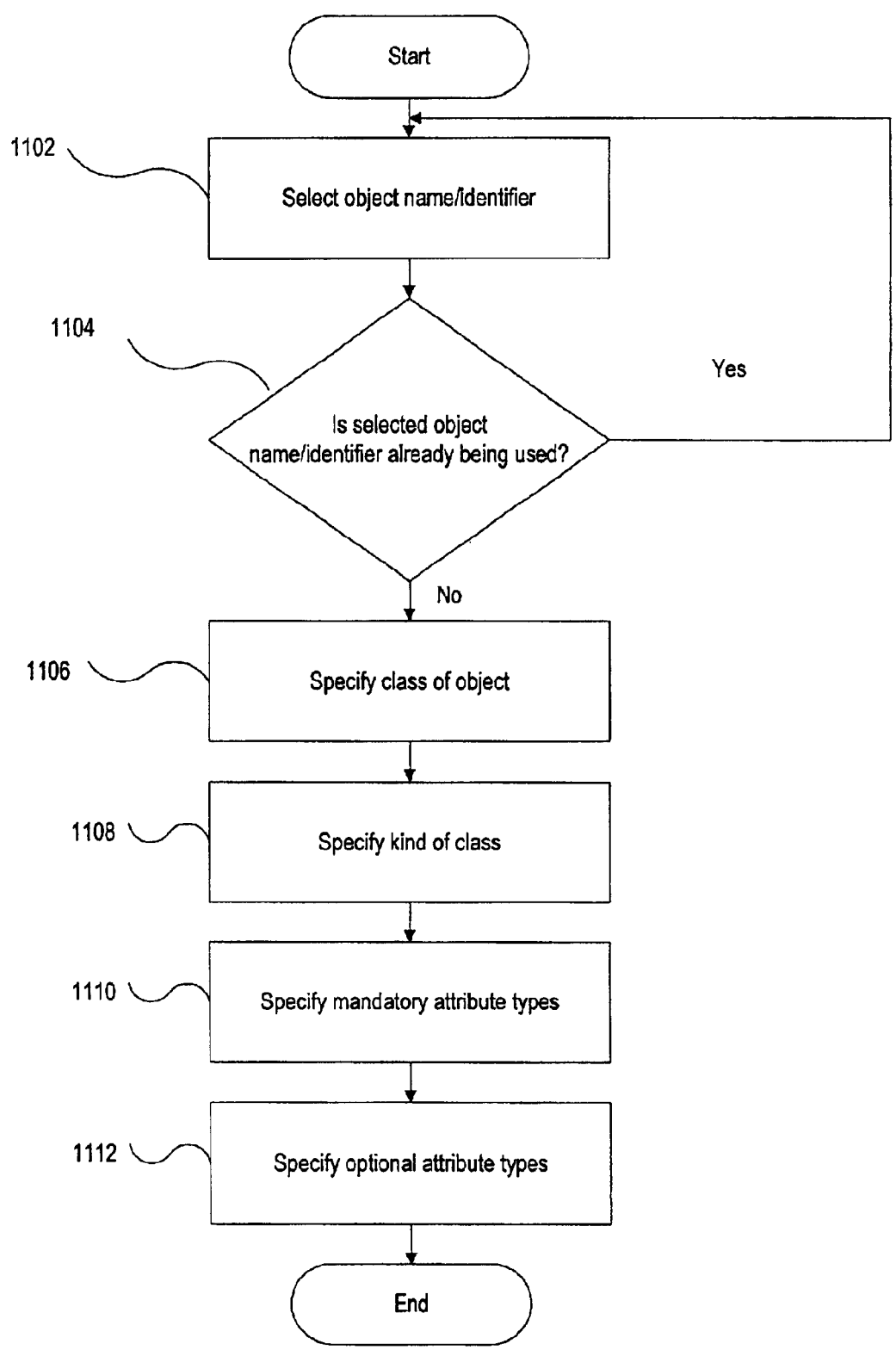
FIG. 11 is a flow diagram showing a process for adding a new object class.

A new object class can be defined by inserting a subschema entry into the attribute_store table that describes the new object class. Referring to FIG. 11, the following process actions are performed in an embodiment of the invention to define a new object class:

1. Select an object name and/or identifier for the new object class (1102). Determine whether the selected name/identifier for the object class is unique across all schema components (1104). If the object name/identifier is not unique, then select an alternate object name/identifier.
2. Indicate which classes this new object class is to be a subclass of (1106). Only abstract object classes should be superclasses of an abstract object class. The referenced schema components (e.g., superior object classes, mandatory and optional attributes) should already exist.
3. Indicate the AttriKind category for the object class being defined (1108).
4. List the mandatory attribute types that an entry of the object class shall contain (in addition to the mandatory attribute types of its superior object classes) (1110). An optional attribute used in one of the superior object classes can be made mandatory in the new object class.
5. List the optional attribute types that an entry of the object class may contain (in addition to the optional attributes of its superior object classes) (1112). A mandatory attribute used in one of the superior object classes can not be made optional in the new object class.

E. Modify an Existing Object Class

Figure 12:
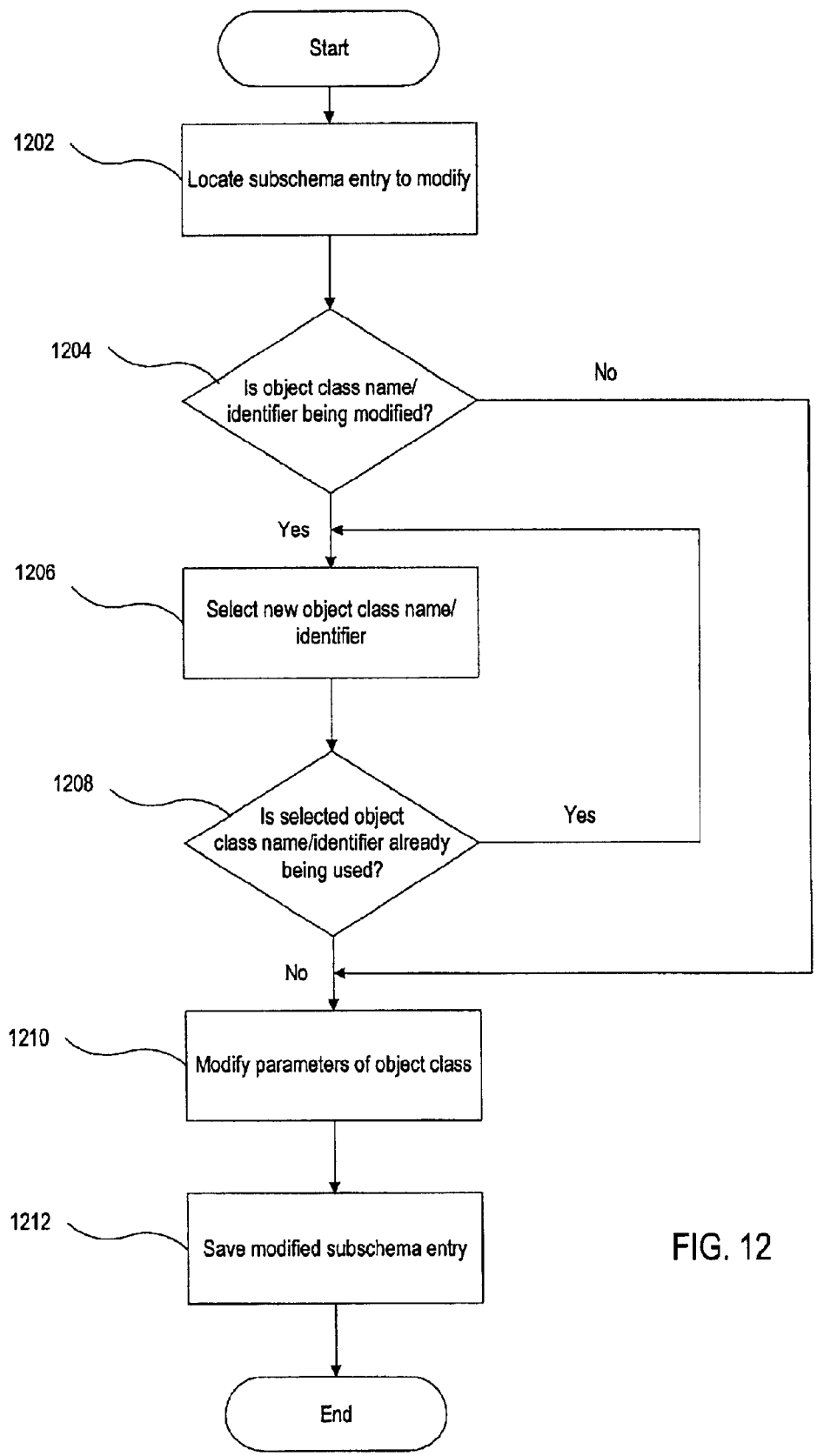
FIG. 12 is a flow diagram showing a process for modifying an object class.

An existing object class can be modified by editing the appropriate subschema entry in the attribute_store table. Referring to FIG. 12, the following process actions are performed in an embodiment of the invention to modify an existing object class:

1. Select the appropriate subschema entry to modify (1202). The selected subschema entry should be the row in the attribute_store table that defines the object class to be modified. The metadata rows in the attribute_store table that define an object class can be indexed in a separate catalog table to facilitate the selection of the appropriate subschema entry. If the definition of the object class has been registered (i.e., assigned a name of type object identifier), the object class is static and cannot be modified.
2. Determine whether the object class name and/or identifier is being modified (1204). If the object class name/identifier is being modified, then select a new object class name/identifier (1206). If the selected object class name/identifier is already being used, then select an alternate object class name/identifier (1208).

3. Modify parameters of the object class (1210). A mandatory attribute can be made optional. However, a new mandatory attribute cannot be added. New optional attributes can be added to the definition of the object class. In an embodiment, no attribute (mandatory or optional) can be removed. In an alternate embodiment, attributes can be removed so long as all existing members of the object class do not have values for the attributes to be removed. More superior object classes can be added to the object class. However, a superior object class can not be removed. An 'Auxiliary' object class can be converted to a 'Structural' or an 'Abstract' object class. An 'Abstract' object class can be converted to an 'Auxiliary' or a 'Structural' object class as long as the 'Abstract' object class is not being used as a superior object class of an 'Abstract' object class. The type of a 'Structural' object class cannot be changed.

4. Save or commit modifications to the subschema entry in the attribute_store table (1212).

F. Delete an Existing Object Class

Figure 13:
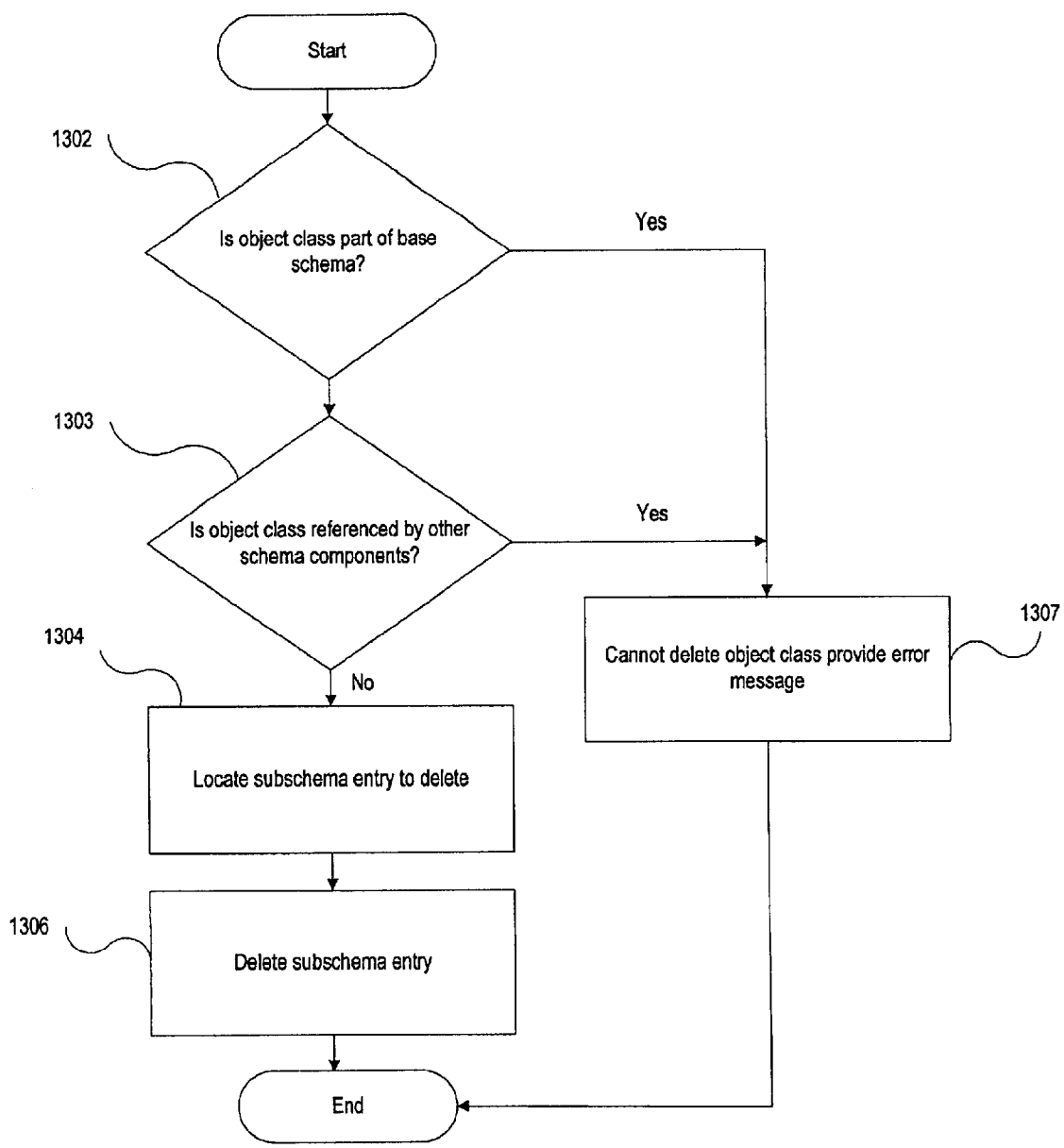
FIG. 13 is a flow diagram showing a process for deleting an object class.

An existing object class can be deleted by deleting the appropriate subschema entry in the attribute store table. Referring to FIG. 13, the following process actions are performed in an embodiment of the invention to delete an existing object class:

1. Determine whether object class to be deleted is part of the base schema (1302). Certain object classes are defined as part of the base schema of the database and cannot be deleted from the system. If the object class is part of the base schema, provide an error message indicating that the object class cannot be deleted (1307).

2. Determine whether the object class to be deleted is referenced by any other schema components (1303). An object class cannot be deleted if it is referenced either directly or indirectly by any other schema component. If the object class is being referenced, provide an error message indicating that the object class cannot be deleted (1307).

3. Locate the appropriate subschema entry in the attribute_store table that corresponds to the object class to be deleted (1304).

4. Delete subschema entry from the attribute_store table and commit the delete operation (1306).

G. Generating a Statement in a Database Query Language

A system and method for generating a statement in a database query language for querying LDAP data from database tables is disclosed in more detail in copending U.S. Application Ser. No. [Not Yet Assigned], Attorney Dkt. No. 235/257, entitled "System and Method for Generating a Database Query Language Statement", which was filed on even day herewith, and which is hereby incorporated by reference in its entirety.

Hardware Overview

Figure 14:
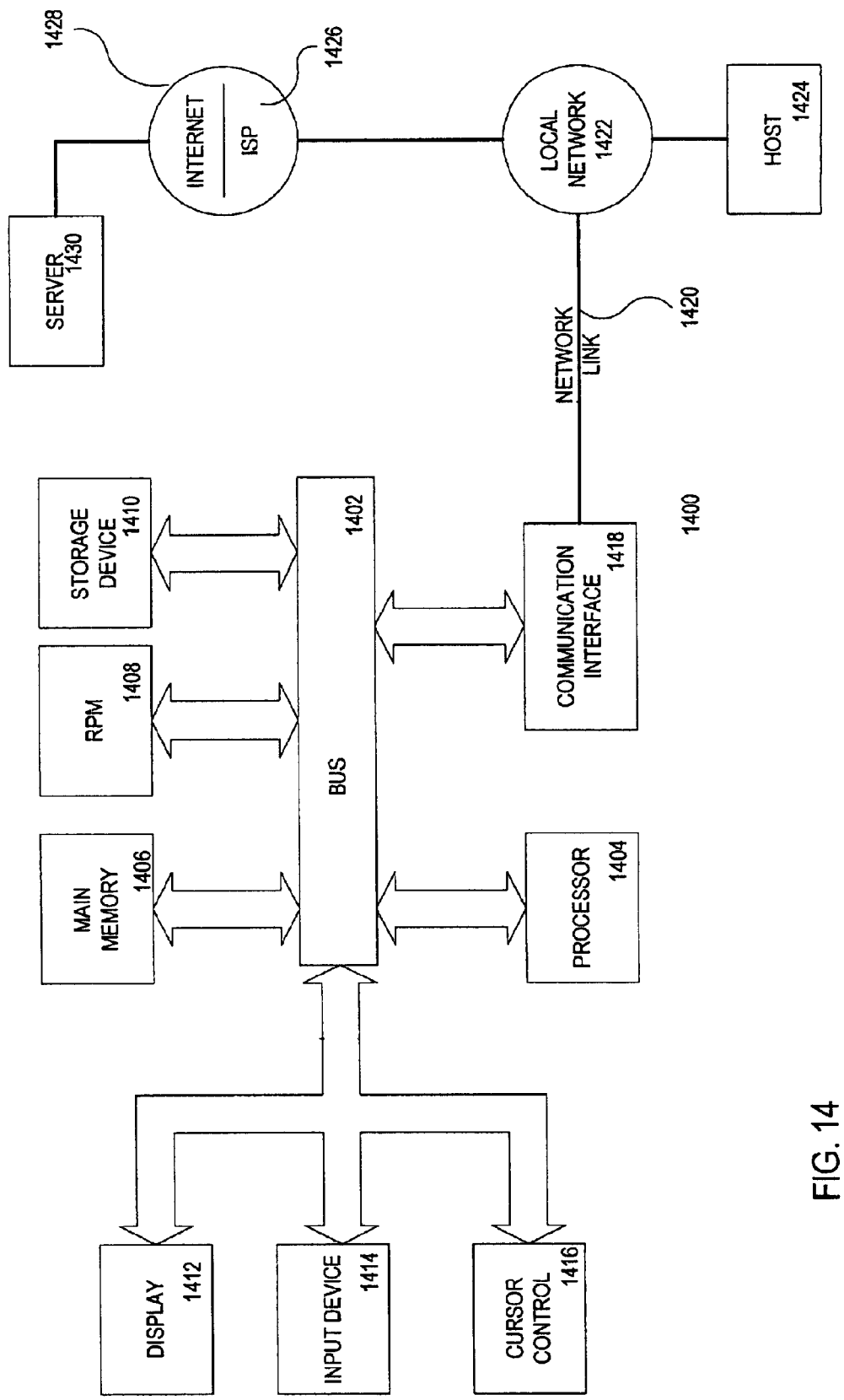
FIG. 14 is a diagram of a computer hardware system with which the present invention can be implemented.

FIG. 14 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 19400 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902.for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for the storage and access of object-oriented structures in a relational database system. According to one embodiment of the invention, such use is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. One or more processors in a multi-processing arrangement may also be employed to execute the sequences of instructions contained in main memory 1906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector coupled to bus 1902 can receive the data carried in the infrared signal and place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application provides for the storage and representation of object-oriented data in a relational database system.

The received code may be executed by processor 1904 as it is received, and/or stored in storage device 1910, or other non-volatile storage for later execution. In this manner, computer system 1900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A system for representing object-oriented entities in a relational table comprising:

a database table comprising data identifying attribute values, said attribute values associated with respective attributes of an object that belongs to an object class;

one or more catalog tables associated with said database table, each of said one or more catalog tables corresponding to one of said attributes and comprising information that relates one or more of said attribute values that are associated with said one of said attributes to said object represented within said database table.

2. The system of claim 1 in which said object comprises a directory information object.

3. The system of claim 2 in which said directory information object comprises LDAP information.

4. The system of claim 2 in which said directory information object comprises X.500 information.

5. The system of claim 1 in which said database table comprises a column identifying attribute names.

6. The system of claim 1 in which said database table comprises a column identifying said attribute values.

7. The system of claim 1 in which said database table comprises a column identifying object identifiers.

8. The system of claim 1 in which said one or more catalog tables each comprises a row identifying an object identifier that correlates to one of said attribute values.

9. The system of claim 1 in which said attribute values are stored in said database table in a protocol ready format.

10. The system of claim 9 which said protocol ready format is the LDAP protocol format.

11. A system for representing object-oriented entities in relational tables comprising:

a database table comprising data identifying attributes of objects belonging to a plurality of object classes; and a distinguished names table comprising information that identify unique system identification names for said objects represented in said database table.

12. The system of claim 11 in which said distinguished names table identifies full paths of parent objects for said objects.

13. The system of claim 12 in which said full paths of parent objects are stored with higher hierarchical levels of the paths listed before lower hierarchical levels of the paths of said parent objects.

14. The system of claim 11 in which said information from said distinghished names table identifies relative distinguished names of said objects.

15. A method for representing object-oriented entities in a relational table comprising:

storing attribute information for attributes of an object belonging to an object class in a database table, said database table comprising one row for each of said attributes; and generating one or more catalog tables associated with said database table, each of said one or more catalog tables corresponding to one of said attributes and comprising information that relates one or more of said attribute values that are associated said one of said attribute to said object represented within said database table.

16. A method for representing object-oriented entities in a relational table comprising:

storing attribute information for attributes of objects belonging to a plurality of object classes in a database table, said database table comprising one row for each attribute;

storing identification data in a distinguished names table; and said identification data identifying unique system identification names for said objects represented in said database table.

* * * * *